United States Patent
Kang et al.

(10) Patent No.: US 10,430,590 B2
(45) Date of Patent: Oct. 1, 2019

(54) APPARATUS FOR QUANTIFYING SECURITY OF OPEN-SOURCE SOFTWARE PACKAGE, AND APPARATUS AND METHOD FOR OPTIMIZING OPEN-SOURCE SOFTWARE PACKAGE

(71) Applicant: ELECTRONICS AND TELECOMMUNICATIONS RESEARCH INSTITUTE, Daejeon (KR)

(72) Inventors: Junghwan Kang, Daejeon (KR); Seunghun Han, Daejeon (KR); Wook Shin, Daejeon (KR); HyoungChun Kim, Daejeon (KR)

(73) Assignee: ELECTRONICS AND TELECOMMUNICATIONS RESEARCH INSTITUTE, Dajeon (KR)

( * ) Notice: Subject to any disclaimer, the term of this patent is extended or adjusted under 35 U.S.C. 154(b) by 185 days.

(21) Appl. No.: 15/404,632

(22) Filed: Jan. 12, 2017

(65) Prior Publication Data
US 2018/0129812 A1  May 10, 2018

(30) Foreign Application Priority Data
Nov. 8, 2016 (KR) .................. 10-2016-0148256

(51) Int. Cl.
*G06F 21/57* (2013.01)
*G06F 11/36* (2006.01)
(Continued)

(52) U.S. Cl.
CPC .............. *G06F 21/577* (2013.01); *G06F 8/61* (2013.01); *G06F 11/36* (2013.01);
(Continued)

(58) Field of Classification Search
CPC .......... G06F 21/577; G06F 8/61; G06F 11/36; G06F 11/3636; G06F 21/566; H04L 63/1433; H04L 63/20
See application file for complete search history.

(56) References Cited

U.S. PATENT DOCUMENTS

| 8,468,518 | B2 | 6/2013 | Wipfel |
| 8,595,833 | B2 | 11/2013 | Viljoen |

(Continued)

FOREIGN PATENT DOCUMENTS

| JP | 2014-514671 A | 6/2014 |
| JP | 2014-149844 A | 8/2014 |

(Continued)

OTHER PUBLICATIONS

Muhammad Shahzad et al, A large scale exploratory analysis of software vulnerability life cycles, IEEE (Year: 2012).*

(Continued)

*Primary Examiner* — Shanto Abedin
(74) *Attorney, Agent, or Firm* — LRK Patent Law Firm

(57) ABSTRACT

An apparatus for quantifying the security of an open-source software package and an apparatus and method for optimizing an open-source software package. The apparatus for optimizing an open-source software package includes a deletion target selection unit for creating a deletion target package list, which is a list of packages to be deleted from the total list of packages installed in a client, a package test unit for controlling the states of one or more virtual machines included in the client and receiving the result of performing a test case to which the deletion target package list is applied from the client, and a package optimization unit for creating an optimized package list based on the result of performing the test case.

2 Claims, 7 Drawing Sheets

(51) Int. Cl.
*G06F 9/445* (2018.01)
*G06F 8/61* (2018.01)
*G06F 21/56* (2013.01)

(52) U.S. Cl.
CPC ........ *G06F 11/3636* (2013.01); *G06F 21/566* (2013.01); *G06F 2221/033* (2013.01)

(56) References Cited

U.S. PATENT DOCUMENTS

| | | | |
|---|---|---|---|
| 8,707,293 B2 | 4/2014 | Festi | |
| 9,128,801 B2 | 9/2015 | Fox et al. | |
| 9,135,591 B1* | 9/2015 | Nicol | G06F 8/71 |
| 10,235,527 B1* | 3/2019 | Dalessio | G06F 21/577 |
| 2007/0169199 A1* | 7/2007 | Quinnell | G06F 21/577 726/25 |
| 2011/0067009 A1* | 3/2011 | Hosokawa | G06F 8/77 717/132 |
| 2012/0246721 A1* | 9/2012 | Viljoen | G06F 21/577 726/22 |
| 2013/0227683 A1* | 8/2013 | Bettini | G06F 21/57 726/22 |
| 2014/0189873 A1* | 7/2014 | Elder | H04L 63/1433 726/25 |
| 2015/0363294 A1* | 12/2015 | Carback | G06F 8/37 717/132 |
| 2016/0232358 A1* | 8/2016 | Grieco | G06F 21/577 |
| 2017/0171236 A1* | 6/2017 | Ouchn | H04L 63/1433 |
| 2018/0077188 A1* | 3/2018 | Mandyam | H04L 63/1433 |

FOREIGN PATENT DOCUMENTS

| | | |
|---|---|---|
| JP | 5989194 B1 | 9/2016 |
| KR | 10-2011-0051061 A | 5/2011 |
| KR | 10-1145144 B1 | 5/2012 |
| KR | 10-2016-0111695 A | 9/2016 |

OTHER PUBLICATIONS

Su Zhang et al., "Assessing Attack Surface with Component-Based Package Dependency," Network and System Security of Springer, 2015.

David A. Wheeler et al., "Open Source Software Projects Needing Security Investments," IDA Document D-5459, Institute for defense analyses, Jun. 2015.

* cited by examiner

US 10,430,590 B2

APPARATUS FOR QUANTIFYING SECURITY OF OPEN-SOURCE SOFTWARE PACKAGE, AND APPARATUS AND METHOD FOR OPTIMIZING OPEN-SOURCE SOFTWARE PACKAGE

CROSS REFERENCE TO RELATED APPLICATION

This application claims the benefit of Korean Patent Application No. 10-2016-0148256, filed Nov. 8, 2016, which is hereby incorporated by reference in its entirety into this application.

BACKGROUND OF THE INVENTION

1. Technical Field

The present invention relates generally to technology for quantifying the security of an open-source software package and optimizing an open-source software package, and more particularly to technology for quantifying the security of an open-source software package and configuring an optimized package list based on security scores.

2. Description of Related Art

"Open source" refers to software, the source code of which can be read by anybody as long as the rights of the producer of the software or hardware are maintained, or to software distributed under an open source license. Linux, which is one of several operating systems, is a representative example of free software and open-source development.

Linux was created in 1991 based on the Linux kernel developed by Linus Torvalds, on the basis of which about 300 Linux distributions have been developed so far. Linux is being used in various fields, such as servers, embedded systems, mobile devices, IoT, and the like. Because the latest Linux distributions provide a user-friendly Graphic User Interface (GUI) and improved stability and security, the number of worldwide users thereof is increasing.

Based on the characteristics of open source, various Linux-based operating systems have been developed. Mint, Debian, Ubuntu, and Fedora are representative Linux distributions.

Linux is configured with the Linux kernel, libraries, and applications. Here, the Linux kernel controls hardware resources and provides services for enabling applications to use the hardware resources, and the libraries provide a user interface and services. The Linux kernel, libraries, applications, and other components constituting Linux are managed as files called packages, and each Linux distribution includes different packages according to the purpose of use thereof.

Generally, a Linux distribution includes various types of packages in order to provide users with a general-purpose service. However, unnecessary packages consume disk space and increase the risk of exposing software vulnerabilities by increasing the number of attack vectors and attack surfaces. Also, they may increase the risk of privileges for accessing a user terminal being leaked to attackers or the risk of installation of malware.

However, there are no criteria for determining whether a package is prone to software vulnerabilities or whether a package is a potentially dangerous package. Also, because there is no technique for providing a user with information about the security of a package in order to enable the user to recognize a package having a low security level, it is difficult to manage packages in terms of security. In connection with this, Korean Patent Application Publication No. 10-2016-0111695 discloses a technology related to "Method and apparatus for collecting application package file."

SUMMARY OF THE INVENTION

An object of the present invention is to quantifying the security of an open-source software package by analyzing the open-source software package.

Another object of the present invention is to provide a user with the security scores of quantified open-source software packages, whereby the user may manage open-source software packages based on the security scores thereof.

A further object of the present invention is to configure an optimized package list based on the security scores of open-source software packages.

In order to accomplish the above objects, an apparatus for optimizing an open-source software package according to the present invention includes a deletion target selection unit for creating a deletion target package list, which is a list of packages to be deleted from a total list of packages installed in a client, based on a security score corresponding to an open-source software package; a package test unit for controlling states of one or more virtual machines included in the client and receiving a result of performing a test case to which the deletion target package list is applied from the client; and a package optimization unit for creating an optimized package list based on the result of performing the test case.

Here, the deletion target selection unit may create the deletion target package list using a preset essential package list.

Here, the package test unit may receive the result of performing the test case for a list of packages remaining after packages in the deletion target package list are deleted from the total list of packages from the client.

Here, the package test unit may store an initial state of the virtual machine, may control the virtual machine so as to perform the test case for a list of packages remaining after deleting a first deletion target package, may restore the virtual machine to the initial state after the test case is performed, and may control the virtual machine so as to perform the test case for a list of packages remaining after deleting a second deletion target package.

Here, the package test unit may control the client so as to perform the test case for a list of the remaining packages during a preset test case performance time.

Here, the apparatus may further include a security information reception unit for receiving a security score for at least one of a Common Vulnerabilities and Exposures (CVE) record, a package binary file, a source file, and a package development project, which correspond to the open-source software package, from an apparatus for quantifying security of the open-source software package, which calculates the security score.

Also, an apparatus for quantifying security of an open-source software package according to the present invention includes a CVE record analysis unit for calculating a CVE security score based on information about a CVE record corresponding to an open-source software package; a binary file analysis unit for calculating a security score of a plurality of binary files for installing the open-source software package by analyzing the binary files; a source file analysis unit for calculating a security score of a plurality of source files of the open-source software package by analyzing the source files; a development project analysis unit for calculating a security score of a package development project of the open-source software package by analyzing information about the package development project; and a security score calculation unit for creating security information of the open-source software package by totaling the calculated security scores.

Here, the CVE record analysis unit may search the National Vulnerability Database (NVD) for the information about the CVE record corresponding to the open-source software package, and may calculate the CVE security score using an analysis result, which includes at least one of a number, a description, an access vector, a number of issues, and a total of CVSS scores of the found CVS record.

Here, the binary file analysis unit may calculate the security score of the binary files using an analysis result, which includes at least one of a size of the binary files, a size of a file acquired by decompressing the binary files, a number and size of ELF files, a size of a text area of the ELF file, a number and size of script files to which execute permissions are granted, and a type and number of packages requiring a dependency package, corresponding to the open-source software package.

Here, the source file analysis unit may calculate the security score of the source files using an analysis result, which includes at least one of cyclomatic complexity of source code of the source files, a number of lines of the source files, and a number of lines of comments in the source files.

Here, the development project analysis unit may calculate the security score of the package development project using an analysis result, which includes at least one of a URL, a development language, a development license, a number of users and developers contributing to development, a frequency of source code commits, and a frequency of patching and updating, corresponding to the package development project.

Here, the apparatus may further include a security information output unit for outputting the security information of the open-source software package using a graphic user interface.

Here, the security information output unit may output the security information of the open-source software package in a format of at least one of a sum of the security scores, an arithmetic mean thereof, and a percentage.

Also, a method for optimizing an open-source software package, performed by an apparatus for optimizing the open-source software package according to an embodiment of the present invention, includes creating a deletion target package list, which is a list of packages to be deleted from a total list of packages installed in a client, based on a security score corresponding to the open-source software package; controlling states of one or more virtual machines included in the client; receiving a result of performing a test case, to which the deletion target package list is applied, from the client; and creating an optimized package list based on the result of performing the test case.

Here, creating the deletion target package list may be configured to create the deletion target package list using a preset essential package list.

Here, receiving the result of performing the test case may be configured to receive the result of performing the test case for a list of packages, remaining after packages in the deletion target package list are deleted from the total list of packages, from the client.

Here, controlling the states of the one or more virtual machines may include storing an initial state of the virtual machine; controlling the virtual machine so as to perform the test case for a list of packages remaining after deleting a first deletion target package; restoring the virtual machine to the initial state after the test case is performed; and controlling the virtual machine so as to perform the test case for a list of packages remaining after deleting a second deletion target package.

Here, controlling the states of the one or more virtual machines may be configured to control the client so as to perform the test case for the list of the remaining packages during a preset test case performance time.

Here, the security score for the open-source software package may be received from an apparatus for quantifying security of the open-source software package, which calculates the security score.

Here, the security score may be a security score for at least one of a CVE record, a package binary file, a source file, and a package development project, corresponding to the open-source software package.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
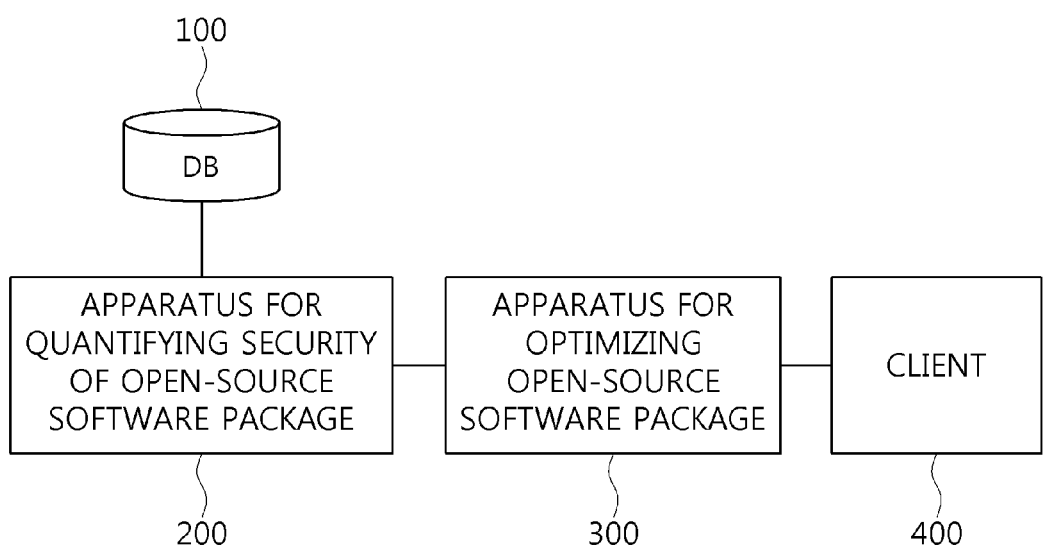
FIG. 1 is a view that schematically shows an environment in which an apparatus for quantifying the security of an open-source software package and an apparatus for optimizing an open-source software package according to an embodiment of the present invention are applied.

Because the present invention may be variously changed and may have various embodiments, specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a view that schematically shows an environment in which an apparatus for quantifying the security of an open-source software package and an apparatus for optimizing an open-source software package according to an embodiment of the present invention are applied.

As illustrated in FIG. 1, a system for quantifying the security of an open-source software package and optimizing an open-source software package includes a security information database 100, an apparatus 200 for quantifying the security of an open-source software package, an apparatus 300 for optimizing an open-source software package, and a client 400.

The apparatus 200 for quantifying the security of an open-source software package analyzes Common Vulnerabilities and Exposures (CVE) corresponding to an open-source software package, and thereby calculates a CVE security score. Also, it analyzes binary files that configures the open-source software package, and thereby calculates the security score of the binary files.

Also, the apparatus 200 for quantifying the security of an open-source software package analyzes the state of the development project of the open-source software package, and thereby calculates the security score of the package development project.

Also, the apparatus 200 for quantifying the security of an open-source software package creates security information of the open-source software package by totaling the calculated security scores. Then, the apparatus 200 for quantifying the security of an open-source software package may store the created security information in the security information database 100, or may provide it to a user by outputting it. Also, the apparatus 200 for quantifying the security of an open-source software package sends the security information to an external output device or a package management system, so that the external output device or the package management system may output the security information.

Next, the apparatus 300 for optimizing an open-source software package receives the security information corresponding to the open-source software package from the apparatus 200 for quantifying the security of an open-source software package.

The apparatus 300 for optimizing an open-source software package creates a deletion target package list, which is a list of packages to be deleted from the total list of packages installed in the client 400, based on the received security information.

Also, the apparatus 300 for optimizing an open-source software package controls the states of one or more virtual machines included in the client 400 and receives the result of performing a test case to which the deletion target package list is applied from the client 400. Then, the apparatus 300 for optimizing an open-source software package creates an optimized package list based on the received result of performing the test case.

Finally, the client 400 includes one or more virtual machines and performs a test case for the open-source software package using the virtual machines. Also, the client 400 sends the result of performing the test case to the apparatus 300 for optimizing an open-source software package.

Here, an "open-source software package" may be a Linux package, and the apparatus 200 for quantifying the security of an open-source software package may manage packages based on the security score thereof, whereby the security of a Linux terminal may be improved. Also, when a Linux package is configured, the apparatus 300 for optimizing an open-source software package may create an optimized package list by selecting packages having a high security level.

Hereinafter, the configurations of an apparatus for quantifying the security of an open-source software package and an apparatus for optimizing an open-source software package according to an embodiment of the present invention will be described in detail with reference to FIG. 2 and FIG. 3.

Figure 2:
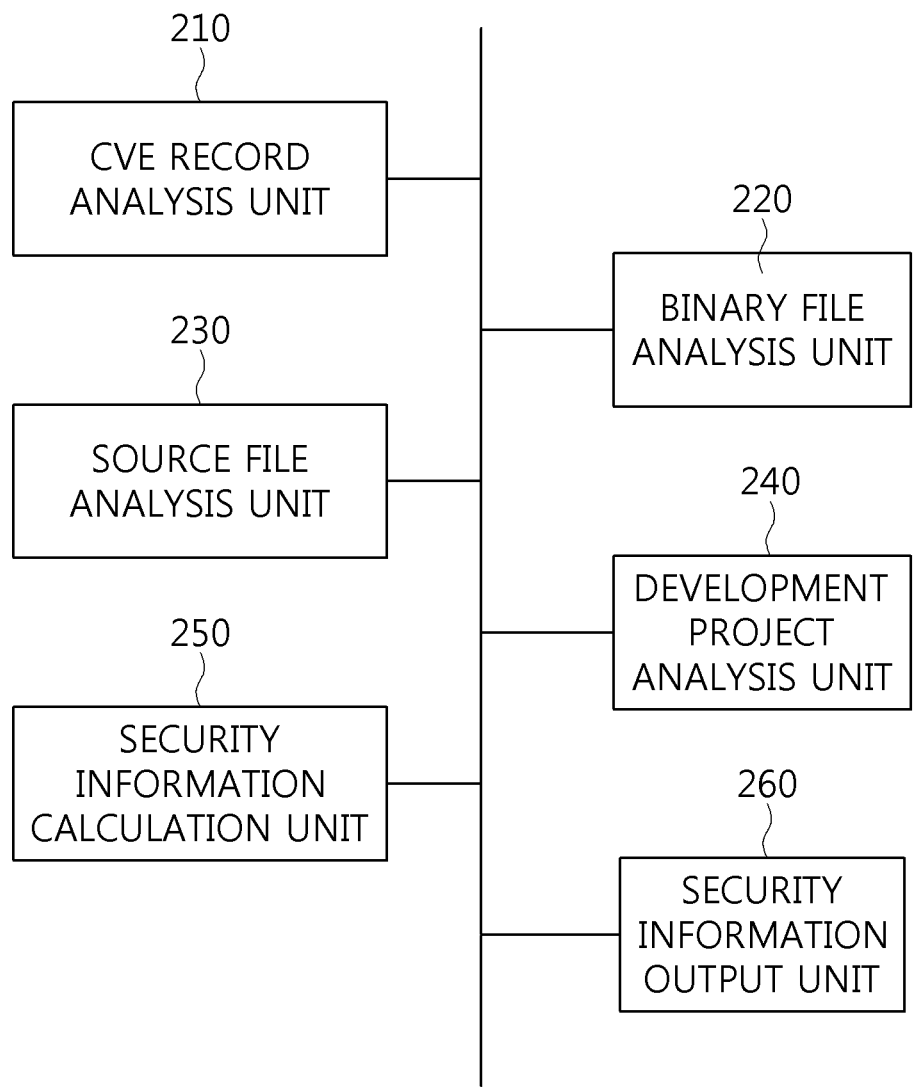
FIG. 2 is a block diagram that shows the configuration of an apparatus for quantifying the security of an open-source software package according to an embodiment of the present invention.

FIG. 2 is a block diagram that shows the configuration of an apparatus for quantifying the security of an open-source software package according to an embodiment of the present invention.

As illustrated in FIG. 2, the apparatus 200 for quantifying the security of an open-source software package includes a CVE record analysis unit 210, a binary file analysis unit 220, a source file analysis unit 230, a development project analysis unit 240, a security information calculation unit 250, and a security information output unit 260.

The CVE record analysis unit 210 searches the National Vulnerability Database (NVD) for Common Vulnerabilities and Exposures (CVE) records for software that has the same name as the open-source software package. Then, the CVE record analysis unit 210 calculates the CVE security score by analyzing the found CVE records for a specified year.

Here, the CVE record analysis unit 210 searches for CVE records in a specified period based on a given year, month, and day, analyzes at least one of a CVE number, a CVE description, a CVE access vector, the number of CVE issues, and the total of the Common Vulnerability Scoring System (CVSS) scores, and thereby calculates the CVE security score for the open-source software package.

The binary file analysis unit 220 downloads binary files for installing the open-source software package from an external package repository and calculates the security score of the binary files by analyzing the downloaded binary files.

Here, the binary file analysis unit 220 may calculate the security score of the binary files of the open-source software package by analyzing at least one of the size of the binary files, the total size of files when the binary files are decompressed, the number and size of Executable Linkable Format (ELF) files, the size of the text area of the ELF file, the number and size of script files having execute permissions, the number and size of executable files having SetUID and SetGUID permissions, and the type and number of packages that include the corresponding open-source software package as a dependency package.

When the source files of the open-source software package are released, the source file analysis unit 230 downloads the released source files from an external package repository. Then, the source file analysis unit 230 calculates the security score of the source files by analyzing at least one of the cyclomatic complexity of the source code of the downloaded source files, the number of lines, and the number of lines of comments.

If there is an open-source development project site for the open-source software package, the development project analysis unit 240 analyzes basic information about the development project, which includes at least one of the homepage URL of the open-source development project site, the download URL thereof, the main development language thereof, the user community URL thereof, and the development license.

Also, the development project analysis unit 240 analyzes activation information of the development project, which includes at least one of the total number of users and developers contributing to the open-source development project, the frequency of source code commits during a specific period, and the time taken to release patches and updates after bugs and vulnerabilities have been revealed. Then, the development project analysis unit 240 calculates the security score of the package development project based on the analyzed basic information about the open-source development project and the analyzed activation information.

The security information calculation unit 250 creates security information of the open-source software package by totaling the security scores calculated by at least one of the CVE record analysis unit 210, the binary file analysis unit 220, the source file analysis unit 230, and the development project analysis unit 240.

Here, the security information calculation unit 250 may store the respective security scores and the security information, acquired by totaling the respective security scores, in the database, and may search the database for the respective security scores and the security information of the open-source software package as needed.

The security information output unit 260 searches the database for at least one of the respective security scores and the security information acquired by totaling the security scores and provides the found information to a user. The security information output unit 260 may output the security information of the open-source software package using a Graphic User Interface (GUI). Also, the security information output unit 260 may output the security information as at least one of the sum of the security scores, the arithmetic mean thereof, and a percentage.

For the convenience of description, the security information output unit 260 has been described as outputting the security information, but without limitation thereto, the security information output unit 260 may send the security information to an external output device or a package management system so that the external output device or the package management system outputs the security information.

Figure 3:
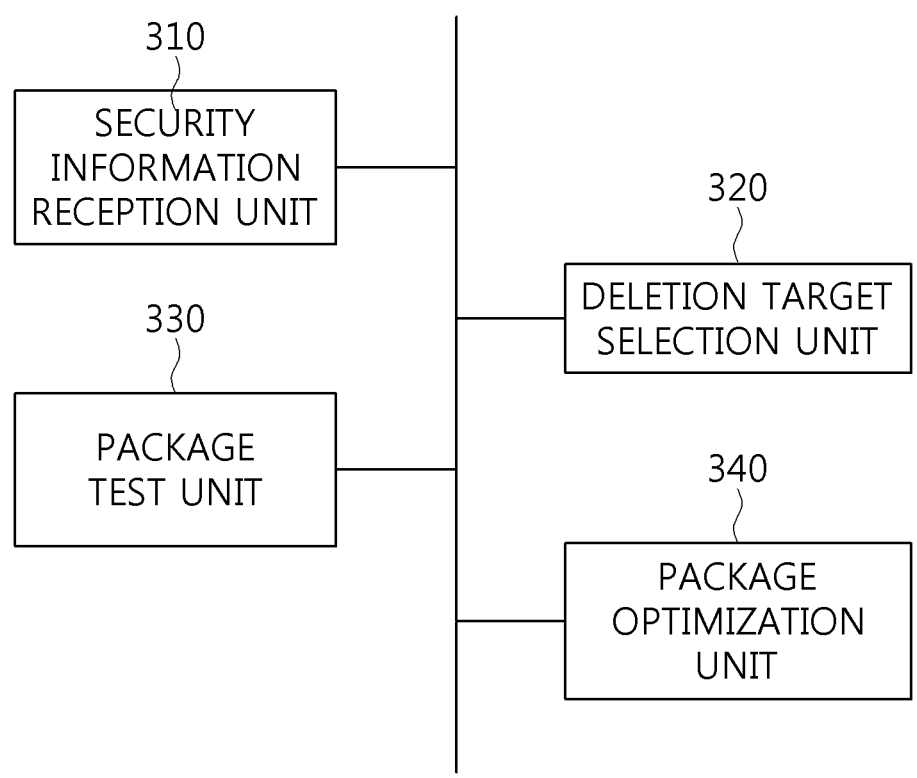
FIG. 3 is a block diagram that shows the configuration of an apparatus for optimizing an open-source software package according to an embodiment of the present invention.

FIG. 3 is a block diagram that shows the configuration of an apparatus for optimizing an open-source software package according to an embodiment of the present invention.

As illustrated in FIG. 3, the apparatus 300 for optimizing an open-source software package includes a security information reception unit 310, a deletion target selection unit 320, a package test unit 330 and a package optimization unit 340.

First, the security information reception unit 310 receives security information corresponding to the open-source software package from the apparatus 200 for quantifying the security of an open-source software package.

Here, the security information reception unit 310 may receive the security score for at least one of the CVE record, the package binary file, the source file, and the package development project corresponding to the open-source software package.

The deletion target selection unit 320 creates a deletion target package list, which is a list of packages to be deleted from the total list of packages installed in the client, based on the security scores.

Here, the deletion target selection unit 320 may create the deletion target package list using a preset essential package list. The preset essential package list may be a whitelist that stores essential packages set by a user, and the deletion target selection unit 320 may create the deletion target package list using the preset essential package list and the security score of the open-source software package.

The package test unit 330 controls the states of one or more virtual machines included in the client. Also, the package test unit 330 receives the result of performing a test case to which the deletion target package list is applied from the client.

Here, the package test unit 330 may receive the result of the test case, performed for the list of the packages remaining after the deletion target packages are deleted from the total list of packages, from the client.

The package test unit 330 stores the initial state of the virtual machine included in the client. Also, the package test unit 330 controls the virtual machine so as to perform a test case for a first remaining package list acquired by deleting a first deletion target package. Also, the package test unit 330 restores the virtual machine to the stored initial state after the test case is performed, and controls the virtual machine so as to perform a test case for a second remaining package list acquired by deleting a second deletion target package.

Then, the package test unit 330 controls the client, so that the client performs all the test cases normally and transmits the results of all the test cases, or so that the client performs test cases for the list of remaining packages during a preset test case performance time.

The package optimization unit 340 creates an optimized package list based on the result of the test cases.

When the test cases performed for all the packages included in the deletion target package list have been completed, the package optimization unit 340 may determine which packages are unnecessary based on the result of the test cases. Then, the package optimization unit 340 may create an optimized package list by deleting the unnecessary packages from the total list of packages installed in the client.

Hereinafter, a method for optimizing an open-source software package according to an embodiment of the present invention will be described in detail with reference to FIG. 4 and FIG. 5.

Figure 4:
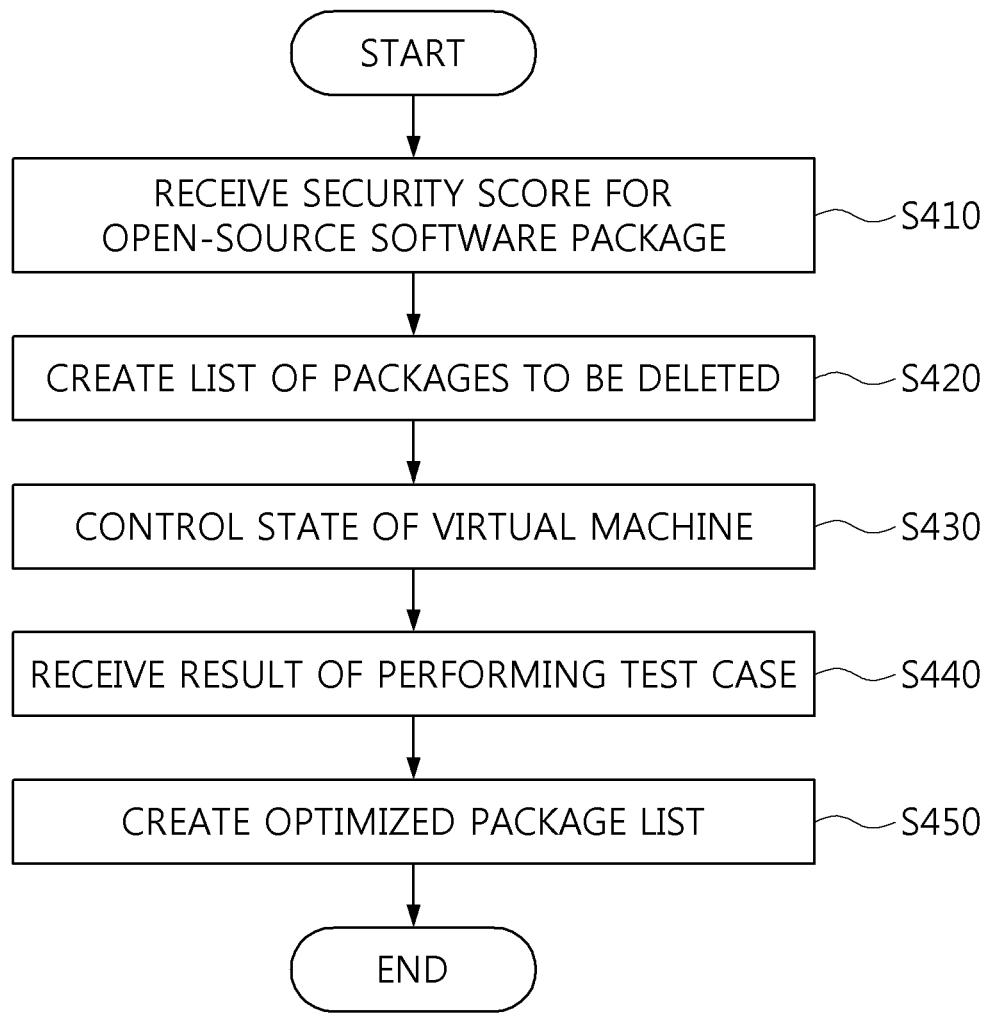
FIG. 4 is a flowchart for describing a method for optimizing an open-source software package according to an embodiment of the present invention.

FIG. 4 is a flowchart for describing a method for optimizing an open-source software package according to an embodiment of the present invention.

First, the apparatus 300 for optimizing an open-source software package receives the security score of an open-source software package at step S410.

The apparatus 300 for optimizing an open-source software package may receive the security score, which includes at least one of the CVE security score, the security score of the package binary file, the security score of the source file, and the security score of the package development project corresponding to the open-source software package, from the apparatus 200 for quantifying the security of an open-source software package.

Because the security score received from the apparatus 200 for quantifying the security of an open-source software package is practically the same as the security information that was described with reference to FIG. 2, a repeated description will be omitted.

Subsequently, the apparatus 300 for optimizing an open-source software package creates a deletion target package list at step S420.

The apparatus 300 for optimizing an open-source software package creates the deletion target package list based on at least one of the security score received at step S410 and a preset essential package list. Here, the apparatus 300 for optimizing an open-source software package may create the deletion target package list by selecting packages to be deleted from the total list of packages installed in the client.

Here, the preset essential package list may be a whitelist including essential packages, and the apparatus 300 for optimizing an open-source software package may exclude the packages included in the essential package list from the deletion target package list, among the total list of packages installed in the client.

Also, the apparatus 30 for optimizing an open-source software package selects the packages, the security score of which is less than a preset threshold value, from the total list of packages, and sets the selected packages as packages to be deleted, thereby creating the deletion target package list. Here, the apparatus 300 for optimizing an open-source software package may exclude the packages included in the essential package list from the deletion target package list.

Also, the apparatus 300 for optimizing an open-source software package controls the state of a virtual machine at step S430. Also, the apparatus 300 for optimizing an open-source software package receives the result of performing a test case from the client at step S440.

The apparatus 300 for optimizing an open-source software package controls the states of one or more virtual machines included in the client, so that the virtual machines perform a test case for the open-source software package.

The apparatus 300 for optimizing an open-source software package may utilize the test case to test security after a specific package is deleted from a virtual machine of the client.

The apparatus 300 for optimizing an open-source software package may receive the result of the test cases performed in such a way that the multiple virtual machines included in the client respectively test the packages included in the deletion target package list in parallel. Here, the test case may be one that has been developed based on a use case for testing a function of a service that is necessary for users.

The apparatus 300 for optimizing an open-source software package may create a snapshot by storing the initial state of a virtual machine before a test case is performed. Then, the apparatus 300 for optimizing an open-source software package restarts the virtual machine after deleting a deletion target package from the total list of packages. Through this process, the apparatus 300 for optimizing an open-source software package makes the client perform the test case for the configuration in which the deletion target package is deleted.

Here, when the deletion target package is deleted from the total list of packages installed in the client, the apparatus 300 for optimizing an open-source software package may receive a list of packages that remain after the deletion target package is deleted from the total list of packages from the client before a test case is performed.

Also, when the test case for the deletion target package has been completed, the apparatus 300 for optimizing an open-source software package restores the virtual machine to the previously stored initial state. Then the apparatus 300 for optimizing an open-source software package controls the virtual machines of the client so as to perform a test case for the next deletion target package.

Here, the apparatus 300 for optimizing an open-source software package may receive the result of a test case performed for each deletion target package whenever the test case has been completed, or may receive the results of all test cases at the same time after the test cases performed for all the packages included in the deletion target package list have been completed.

Also, the apparatus 300 for optimizing an open-source software package may control the client so as to repeatedly perform a test case for all the packages included in the deletion target package list, or may control the client so as to perform a test case during a preset test case performance time.

Also, the apparatus 300 for optimizing an open-source software package may store the results of performing test cases, which are received from the client.

Finally, the apparatus 300 for optimizing an open-source software package creates an optimized package list at step S450.

The apparatus 300 for optimizing an open-source software package may determine which packages are unnecessary based on the result of performing the test cases. Also, the apparatus 300 for optimizing an open-source software package may create the optimized package list by deleting the unnecessary packages from the total list of packages installed in the client.

Figure 5:
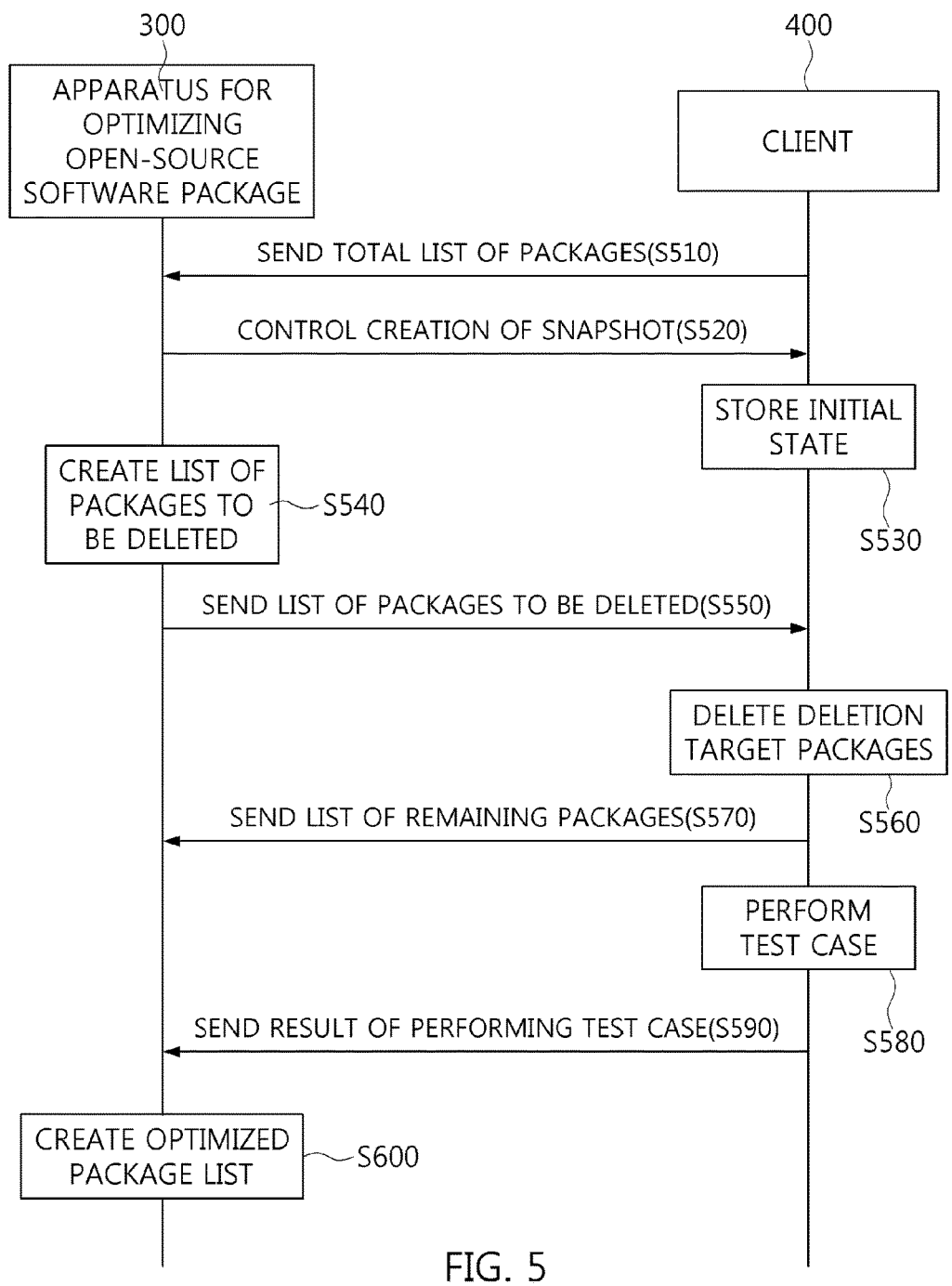
FIG. 5 is a flowchart for describing a method for controlling a client of an open-source software package according to an embodiment of the present invention.

FIG. 5 is a flowchart for describing a method for controlling a client of an open-source software package according to an embodiment of the present invention.

First, the client 400 sends the total list of packages to the apparatus for 300 for optimizing an open-source software package at step S510.

The apparatus 300 for optimizing an open-source software package receives the total list of packages installed in the client 400 from the client 400. In FIG. 5, the apparatus 30 for optimizing an open-source software package, implemented in the form of a server, may control the state of the client 400.

For the convenience of description, the process in which the apparatus 300 for optimizing an open-source software package receives a security score from the apparatus 200 for quantifying the security of an open-source software package is not illustrated in FIG. 5, but the apparatus 300 for optimizing an open-source software package may receive the security score from the apparatus 200 for quantifying the security of an open-source software package and store the security score before or after step S510.

Subsequently, the apparatus 300 for optimizing an open-source software package controls the client 400 so as to create a snapshot at step S520, and the client 400 stores the initial state of a virtual machine at step S530.

The apparatus 300 for optimizing an open-source software package controls the client 400 so as to create the snapshot and to thereby store the initial state of the virtual machine included in the client. Here, the apparatus 300 for optimizing an open-source software package controls the client so as to create the snapshot in order to restore the virtual machine to the initial state after the virtual machine performs a test case at step S580, which will be described later.

Also, the apparatus 300 for optimizing an open-source software package creates a deletion target package list at step S540.

The apparatus 300 for optimizing an open-source software package receives the total list of packages from the client 400 at step S510, receives the security information from the apparatus 200 for quantifying the security of an open-source software package, and then performs step S540, but the sequential position at which step S540 is performed is not limited to that shown in FIG. 5.

The apparatus 300 for optimizing an open-source software package may create the deletion target package list based on at least one of the security score received from the apparatus 200 for quantifying the security of an open-source software package and a preset essential package list.

Here, the apparatus 300 for optimizing an open-source software package may select packages to be deleted from the total list of packages, received from the client 400 at step S510, and may thereby create the deletion target package list.

Also, the preset essential package list may be a whitelist including essential packages, and the apparatus 300 for optimizing an open-source software package may not select the package included in the essential package list as one of the packages to be deleted, among the total list of packages.

Also, the apparatus 300 for optimizing an open-source software package selects the packages, the security score of which is less than a preset threshold value, from the total list of packages, sets the selected packages as the packages to be deleted, and thereby creates the deletion target package list. Also, the apparatus 300 for optimizing an open-source software package may set the packages that are not included in the essential package list, among the packages having a security score that is less than the threshold value, as the packages to be deleted.

Subsequently, the apparatus 300 for optimizing an open-source software package sends the deletion target package list to the client 400 at step S550.

The client 400 deletes a deletion target package at step S560 and sends a list of remaining packages to the apparatus 300 for optimizing an open-source software package at step S570.

The apparatus 300 for optimizing an open-source software package controls the client 400 so as to delete the packages included in the deletion target package list from the total list of packages by sending the deletion target package list, which has been created at step S540, to the client 400. Also, the apparatus 300 for optimizing an open-source software package may receive a list of remaining packages, from which a deletion target package has been deleted, from the client 400.

Also, the client 400 performs a test case for the list of remaining packages at step S580.

The apparatus 300 for optimizing an open-source software package controls the client 400 so as to perform a test case for the purpose of testing security after a specific package is deleted from a virtual machine of the client 400.

For the convenience of description, the client 400 has been described as performing the test case, but the client 400 may perform the test case under the control of the apparatus 300 for optimizing an open-source software package.

The apparatus 300 for optimizing an open-source software package controls the client 400 so as to store the initial state of a virtual machine included in the client 400. The client 400 creates a snapshot by storing the initial state of the virtual machine.

Also, the apparatus 300 for optimizing an open-source software package controls the client 400 so that the client 400 performs a test case, restarts the virtual machine when the test case has been completed, and restores the virtual machine to the stored initial state. Here, the apparatus 300 for optimizing an open-source software package may control the test case, performed by the client 400, by adding, modifying, and deleting test cases.

Here, the apparatus 300 for optimizing an open-source software package controls the client 400 so that the client 400 performs test cases for all the packages included in the deletion target package list or so that the client 400 performs test cases during a preset test case performance time. Also, the apparatus 300 for optimizing an open-source software package may shorten or prolong the test case performance time during which a virtual machine performs a test case.

As described above, under the control of the apparatus 300 for optimizing an open-source software package, the client 400 may test the respective packages included in the deletion target package list on multiple virtual machines in parallel.

Then, the client 400 sends the result of performing the test case to the apparatus 300 for optimizing an open-source software package at step S590, and the apparatus 300 for optimizing an open-source software package creates an optimized package list at step S600 based on the received result of performing the test case.

The apparatus 300 for optimizing an open-source software package stores the result of performing the test case, which is received from the client 400. Also, the apparatus 300 for optimizing an open-source software package searches for a previously stored result of performing the test case, analyzes and collects the test cases that succeeded in the virtual machine, and may thereby create an optimized package list.

Hereinafter, the configuration in which an apparatus for quantifying the security of an open-source software package according to an embodiment of the present invention outputs security information will be described in detail with reference to FIG. 6.

Figure 6:
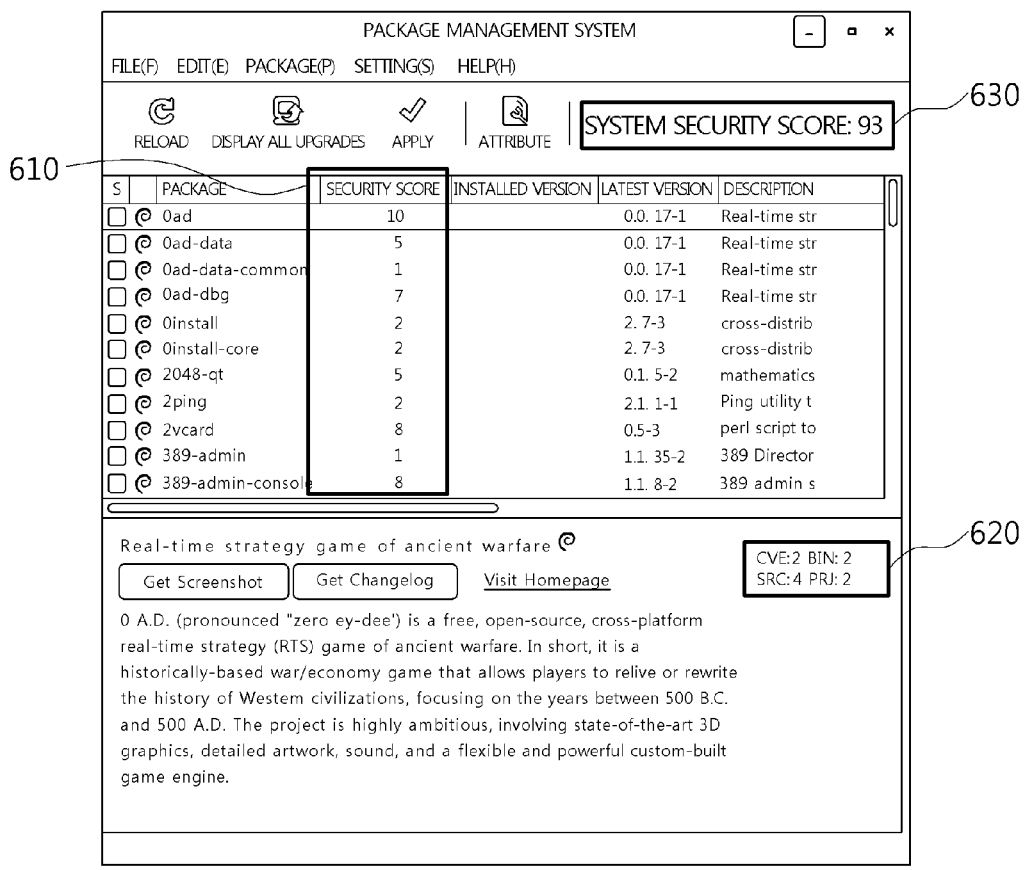
FIG. 6 is a view that shows an example of a screen on which security information according to an embodiment of the present invention is displayed.

FIG. 6 is a view that shows an example of a screen on which security information is displayed according to an embodiment of the present invention.

As illustrated in FIG. 6, the apparatus 200 for quantifying the security of an open-source software package may provide a user with the security information corresponding to the package by outputting it on a user interface (UI). Here, the apparatus 200 for quantifying the security of an open-source software package may search a database for at least one of a security score and security information, which is the sum of security scores, and may provide the found information to a user.

As shown in FIG. 6, the apparatus 200 for quantifying the security of an open-source software package may output the security scores 610 of respective packages, and may output the security scores 620 of respective items of a package. Also, the apparatus 200 for quantifying the security of an open-source software package may provide a user with the security score 630 of the corresponding system by outputting it. Here, the apparatus 200 for quantifying the security of an open-source software package may calculate the security score 630 of the system as the arithmetic mean of the security scores corresponding to respective packages.

In FIG. 6, the security scores 620 of respective items of a package may include at least one of the CVE security score, the security score of a binary file BIN, the security score of a source file SRC, and the security score of a package development project PRJ corresponding to the package.

For the convenience of description, the apparatus 200 for quantifying the security of an open-source software package has been described as searching a database for security information and outputting the found information, but without limitation thereto, the security information may be output in such a way that the apparatus 200 receives a request for security information from an external output device or a package management system, searches for the requested security information, and sends the found security information to the external output device or the package management system.

Figure 7:
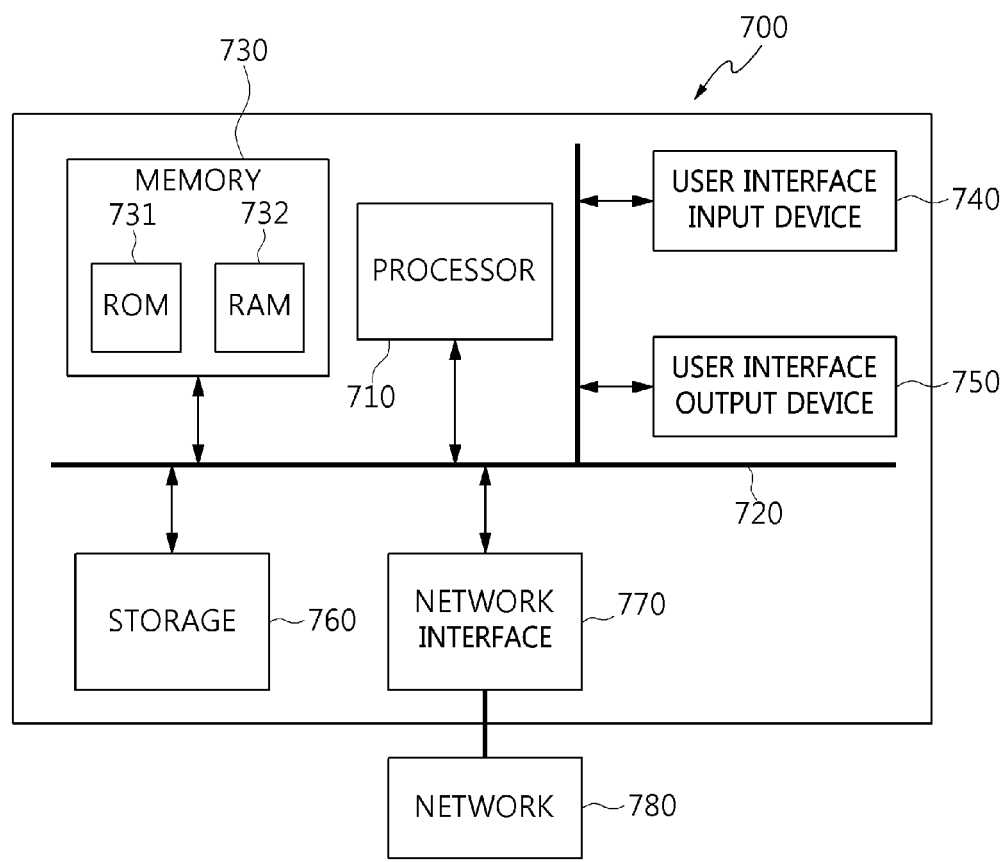
FIG. 7 is a block diagram that shows a computer system according to an embodiment of the present invention.

FIG. 7 is a block diagram that shows a computer system according to an embodiment of the present invention.

Referring to FIG. 7, an embodiment of the present invention may be implemented in a computer system 700, such as a computer-readable storage medium. As illustrated in FIG. 7, the computer system 700 may include at least one processor 710, memory 730, a user interface input device 740, a user interface output device 750, and storage 760, which communicate with each other via a bus 720. Also, the computer system 700 may further include a network interface 770 connected to a network 780. The processor 710 may be a central processing unit (CPU) or a semiconductor device for executing processing instructions stored in the memory 730 or the storage 760. The memory 730 and the storage 760 may include various kinds of volatile or non-volatile storage media. For example, the memory may include ROM 731 or RAM 732.

Accordingly, an embodiment of the present invention may be implemented as a non-volatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, the security of an open-source software package may be quantified by analyzing the open-source software package.

Also, according to the present invention, because the security scores of quantified open-source software packages are provided to a user, the user may manage the open-source software packages based on the security scores thereof.

Also, according to the present invention, it is possible to configure an optimized package list based on the security scores of open-source software packages.

As described above, an apparatus for quantifying the security of an open-source software package and an apparatus and method for optimizing the open-source software package according to the present invention are not limitedly applied to the configurations and operations of the above-described embodiments, but all or some of the embodiments may be selectively combined and configured, so that the embodiments may be modified in various ways.

What is claimed is:

1. An apparatus for quantifying security of an open-source software package, comprising:
   a hardware processor; and
   at least one or more units being configured and executed by the hardware processor using algorithm associated with least one non-transitory storage device,
   wherein the units comprise:
   in response to detection of searches the National Vulnerability Database (NVD) for information of a common vulnerabilities and Exposures (CVE) record corresponding to the open-source software package, a CVE record analysis unit for calculating a CVE security score based on information about a CVE record corresponding to an open-source software package, calculating the CVE security score being performed by the processor using at least one of a number, a description, an access vector, a number of issues, and a total of Common Vulnerability Scoring System (CVSS) scores of the found CVS record;
   a binary file analysis unit for calculating a security score of a plurality of binary files for installing the open-source software package by analyzing the binary files, calculating the security score of a plurality of binary files being performed by the processor using at least one of a size of the binary files, a size of a file acquired by decompressing the binary files, a number and size of Executable Linkable Format (ELF) files, a size of a text area of the ELF file, a number and size of script files to which execute permissions are granted, and a type and number of packages requiring a dependency package, corresponding to the open-source software package;
   a source file analysis unit for calculating a security score of a plurality of source files of the open-source software package by analyzing the source files, calculating a security score of a plurality of source files being performed by the processor using at least one of cyclomatic complexity of source code of the source files, a number of lines of the source files, and a number of lines of comments in the source files;
   a development project analysis unit for calculating a security score of a package development project of the open-source software package by analyzing information about the package development project, calculating a security score being performed by the processor using at least one of a Uniform Resource Locator (URL), a development language, a development license, a number of users and developers contributing to development, a frequency of source code commits, and a frequency of patching and updating, corresponding to the package development project;
   a security score calculation unit for generating security information of the open-source software package by totaling each of the security scores calculated by the binary file analysis unit, the source file analysis unit, and the development project analysis unit; and
   in response to receipt of a request for security information from an external output device or a package management system,
   a security information output unit for quantifying the security information corresponding to the package by displaying the security scores of respective packages, the security scores including at least one of the CVE security score, the security score of a binary file (BIN), the security score of a source file (SRC), and a security score of a package development project (PRJ) corresponding to the open-source software package, wherein the security information output unit outputs the security information of the open-source software package to an apparatus for optimizing an open-source software package so that the security information of the open-source software package is used to generate a deletion target package list.

2. The apparatus of claim 1, wherein the security information output unit outputs the security information of the open-source software package in a format of at least one of a sum of the security scores, an arithmetic mean thereof, and a percentage.

* * * * *